Nov. 10, 1925.  1,561,378
W. L. TRAUTNER ET AL
OIL RETAINER
Filed Sept. 18, 1924
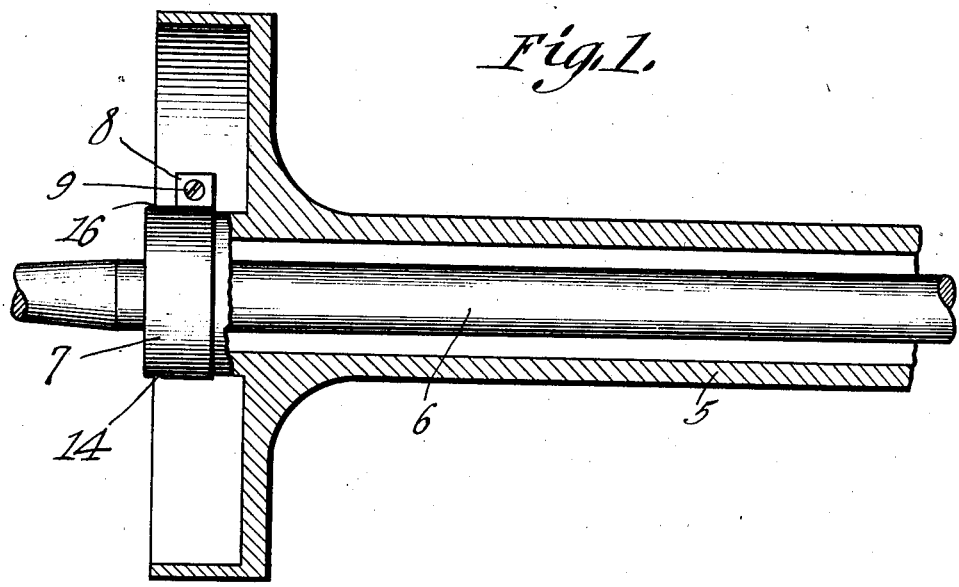
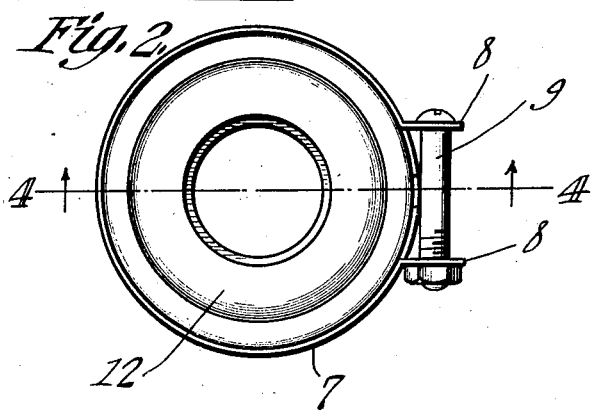
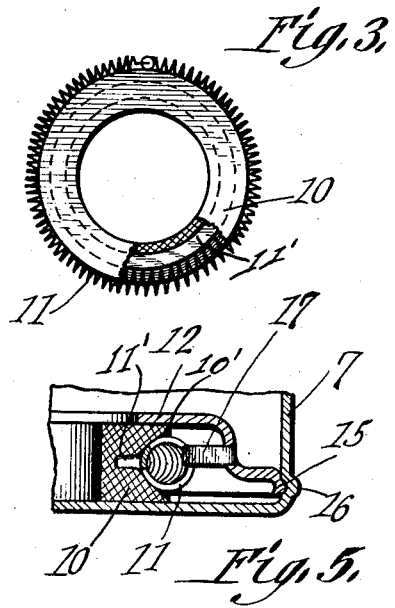
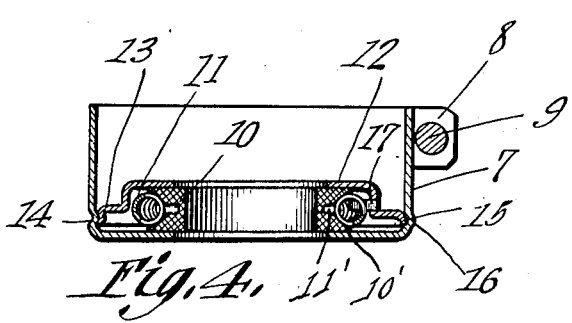
Inventors
W. L. Trautner AND
G. H. Trautner
By CA Snow & Co
Attorneys Patented Nov. 10, 1925.

1,561,378

UNITED STATES PATENT OFFICE.

WILLIAM L. TRAUTNER AND GEORGE H. TRAUTNER, OF ST. PAUL, MINNESOTA.

OIL RETAINER.

Application filed September 18, 1924. Serial No. 738,515.

*To all whom it may concern:*

Be it known that we, WILLIAM L. TRAUTNER and GEORGE H. TRAUTNER, citizens of the United States, residing at St. Paul, in the county of Ramsey and State of Minnesota, have invented a new and useful Oil Retainer, of which the following is a specification.

This invention relates to a grease retainer especially designed for use in connection with the rear axles of motor vehicles and aims to provide novel means whereby the grease usually contained in the rear axle housing of a motor vehicle will be confined to the space within the axle housing and will not be forced laterally therethrough.

An important object of the invention is to provide a device of this character which will have a floating action within its housing to reduce wear to the minimum and insure a fluid-tight contact between the axle and oil retainer positioned thereon.

A still further object of the invention is the provision of means to insure against the retainer rotating with the axle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a sectional view through an axle housing disclosing an axle supplied with a container constructed in accordance with the invention.

Figure 2 is a rear elevational view of the retainer.

Figure 3 is an elevational view of the washer supported within the retainer housing.

Figure 4 is a sectional view taken on line 4—4 of Figure 2.

Figure 5 is a fragmental sectional view disclosing the retaining tongue.

Referring to the drawing in detail, the reference character 5 indicates an axle housing of a motor vehicle in which the axle 6 operates.

The retainer housing is indicated generally by the reference character 7 and as shown is provided with spaced ears 8 formed with openings to accommodate the bolt 9 that extends between the ears and compresses one portion of the housing to insure against the washer to be hereinafter more fully described, becoming displaced.

The washer which is held in the retainer housing and which forms an important feature of the invention is provided with a peripheral groove 10' designed to accommodate the coiled spring 11. This groove merges into a contracted portion indicated at 11' that divides the washer so that the spring may normally act to spread the portions of the washer into engagement with the retainer housing.

Associated with the washer is a retaining cap 12 which is provided with a depression 13 to accommodate the boss 14 formed on the body of the retainer housing 7 to lock the retainer housing against displacement. At the opposite side of the cap 12 is a lug 15 which fits within a depressed portion 16 to further lock the cap 12 when it has been positioned.

Formed integral with the cap 12 is a finger 17 that extends inwardly and is adapted to be disposed between adjacent coils of the spring 11 in a manner as clearly shown by Figure 5, to the end that rotary movement of the washer 10 with respect to the retainer housing is prevented.

It might be further stated that the periphery of the washer 10 is considerably less than the inner diameter of the cap 12 to allow the washer to float within the cap and properly position itself on the axle.

In view of the foregoing detail description, it is believed that a further detailed description as to the operation of the device is unnecessary.

We claim:—

In a device of the character described, a housing, a retainer cap positioned within the housing, a grooved washer positioned within the housing and adapted to move within the retainer cap, a coiled spring positioned within the groove of the washer, a finger stamped from the retainer cap and having its side edges disposed longitudinally with the side faces of the washer, and said finger being disposed between the convolutions of the coiled spring.

In testimony that we claim the foregoing as our own, we have hereto affixed our signatures.

WILLIAM L. TRAUTNER.
GEORGE H. TRAUTNER.